United States Patent [19]

Nakayama et al.

[11] Patent Number: 5,263,364
[45] Date of Patent: Nov. 23, 1993

[54] APPARATUS FOR DETECTING MISFIRE IN MULTICYLINDER INTERNAL COMBUSTION ENGINES

[75] Inventors: Masaaki Nakayama, Toyoake; Hideki Morishima, Anjo; Isamu Nomura, Obu; Akira Ichikawa, Chiryu, all of Japan

[73] Assignee: Nippondenso Co., Ltd., Kariya, Japan

[21] Appl. No.: 971,626

[22] Filed: Nov. 5, 1992

[30] Foreign Application Priority Data

Nov. 8, 1991 [JP] Japan .................................. 3-293414
Aug. 19, 1992 [JP] Japan .................................. 4-220302

[51] Int. Cl.$^5$ .......................................... G01M 15/00
[52] U.S. Cl. .................................... 73/116; 364/431.07
[58] Field of Search ............... 73/116, 117.3; 123/419; 364/431.07

[56] References Cited

U.S. PATENT DOCUMENTS 5,041,980 8/1991 Maddock et al. ................ 73/116 X

FOREIGN PATENT DOCUMENTS 61-258955 11/1986 Japan .

Primary Examiner—Jerry W. Myracle
Attorney, Agent, or Firm—Cushman, Darby & Cushman

[57] ABSTRACT

An apparatus for detecting occurrence of misfire in a multicylinder internal combustion engine detects a rotational speed of the engine in each expansion stroke of each cylinder, calculates a change of the engine rotational speed fluctuation quantity in accordance with a value of the detected rotational speed, and sets a misfire determination value for each cylinder based upon a determination result of the engine operating condition. Misfire determination is made for each cylinder based upon the misfire determination value for each cylinder and the change of the rotational speed fluctuation quantity, thereby elevating the accuracy of detecting occurrence of misfire in each cylinder.

14 Claims, 9 Drawing Sheets

FIG. 4

(REF MAP)

| PM [mmHg] \ NE [rpm] | 500 | 1000 | 1500 | 2000 |
|---|---|---|---|---|
| 160 | REF 11 | REF 12 | REF 13 | REF 14 |
| 260 | REF 21 | REF 22 | REF 23 | REF 24 |
| 360 | REF 31 | REF 32 | REF 33 | |
| 460 | REF 41 | REF 42 | | |

FIG. 5

($\Delta$REFn MAP)

| CYLINDER \ NE [rpm] | 500 | 1000 | 1500 | 2000 |
|---|---|---|---|---|
| 1 | $\Delta$REF 11 | $\Delta$REF 12 | $\Delta$REF 13 | $\Delta$REF 14 |
| 2 | $\Delta$REF 21 | $\Delta$REF 22 | $\Delta$REF 23 | $\Delta$REF 24 |
| 3 | $\Delta$REF 31 | $\Delta$REF 32 | $\Delta$REF 33 | |
| 4 | $\Delta$REF 41 | $\Delta$REF 42 | | |

FIG. 9

(OMG MAP)

| PM [mmHg] \ NE [rpm] | 500 | 1000 | 1500 | 2000 |
|---|---|---|---|---|
| 160 | OMG 11 | OMG 12 | OMG 13 | OMG 14 |
| 260 | OMG 21 | OMG 22 | OMG 23 | OMG 24 |
| 360 | OMG 31 | OMG 32 | OMG 33 | |
| 460 | OMG 41 | OMG 42 | | |

FIG. 10

(PLS MAP)

| PM [mmHg] \ NE [rpm] | 500 | 1000 | 1500 | 2000 |
|---|---|---|---|---|
| 160 | PLS 11 | PLS 12 | PLS 13 | PLS 14 |
| 260 | PLS 21 | PLS 22 | PLS 23 | PLS 24 |
| 360 | PLS 31 | PLS 32 | PLS 33 | |
| 460 | PLS 41 | PLS 42 | | | ions.
APPARATUS FOR DETECTING MISFIRE IN MULTICYLINDER INTERNAL COMBUSTION ENGINES

BACKGROUND OF THE INVENTION

The present invention relates to an apparatus for detecting misfire occurring in a multicylinder internal combustion engine on the basis of the operating condition of the internal combustion engine.

When misfire occurs in an internal combustion engine, complete combustion in a combustion chamber of the internal combustion engine is not achieved, and consequently the engine rotational speed decreases. A prior art apparatus for detecting misfire in a multicylinder engine based on this phenomenon has been known, as is disclosed in JP-A-61-258955, for example, which detects a momentary rotational speed at least at two points in each expansion stroke of each engine cylinder, detects engine speed fluctuations in each expansion stroke of each cylinder, obtains a change $\Delta\omega$ in the engine speed fluctuations (hereinafter simply referred to as "a speed variation quantity $\Delta\omega$") from the engine speed fluctuations which have been detected in the current and last expansion strokes, compares the speed variation quantity $\Delta\omega$ with a predetermined reference misfire determination value, and determines that misfire has occurred in the associated cylinder, if the speed variation quantity is greater than the reference misfire determination value.

However, in such a prior art misfire detecting apparatus, occurrence of misfire in an internal combustion engine is determined based upon a misfire determination value which is uniformly set for all cylinders. Therefore, if the combustion state varies for respective cylinders and the speed variation quantity $\Delta\omega$ varies for respective cylinders, there is a danger of determining erroneously that misfire has occurred in a cylinder exhibiting a large speed variation quantity $\Delta\omega$, in spite that the cylinder is in a normal operating condition and no misfire has occurred. The above-mentioned speed variation quantity $\Delta\omega$ for each cylinder increases as the engine rotational speed increases, because vibration of the body of the internal combustion engine also increases.

FIG. 11 shows a result of measurement of the speed variation quantity $\Delta\omega$ when a six-cylinder internal combustion engine used in a vehicle is operated at a high rotational speed of 4,500 r.p.m. and the vehicle runs on a flat road. The speed variation quantity $\Delta\omega$ varies greatly for respective cylinders as shown by a solid line in the drawing, even if no misfire occurs in the internal combustion engine. The speed variation quantity $\Delta\omega$ of a fourth cylinder #4 becomes greater than that in a normal operation state as shown by a dotted line in FIG. 11 when misfire occurs in the fourth cylinder #4. Accordingly, a fire determination value may be set between the speed variation quantity $\Delta\omega$ at the time of occurrence of misfire in the fourth cylinder #4 and the speed variation quantity $\Delta\omega$ in a normal operation state of the fourth cylinder #4. However, if misfire determination of a third cylinder #3 is made by the use of the same misfire determination value as that of the fourth cylinder #4, it is determined erroneously that misfire has also occurred in the third cylinder #3, because the speed variation quantity $\Delta\omega$ of the third cylinder #3, even when no misfire is occurring therein, is greater than the speed variation quantity $\Delta\omega$ of the fourth cylinder #4. Thus, it is difficult to perform accurate misfire detection only for the actually misfiring cylinder #4.

Accordingly, if a misfire detection value is uniformly set for all cylinders, erroneous determination may be made such that misfire has occurred in a cylinder having a large speed variation quantity $\Delta\omega$, even it is in a normal operation state, as is the case with the third cylinder #3 shown in FIG. 11. Furthermore, since the speed variation quantity $\Delta\omega$ varies greatly at a high rotational speed of the engine, the misfire detection accuracy becomes worse in such a high speed operating state.

The above-mentioned problem can be solved by preliminarily setting a misfire determination value for each cylinder. In this case, the misfire determination values for respective cylinders have to be stored. In a multicylinder internal combustion engine having, for example, 8 or 12 cylinders, excessively large storage capacity is required for storing all the misfire determination values.

SUMMARY OF THE INVENTION

The present invention was made for overcoming the above-mentioned problem.

It is therefore an object of the present invention to provide an apparatus for detecting misfire occurring in a multicylinder internal combustion engine which is capable of accurately detecting misfire, even if a speed variation quantity $\Delta\omega$ varies for respective cylinders in a normal operating state, without setting a misfire determination value for each cylinder.

In a first aspect of the present invention, there is provided an apparatus for detecting misfire occurring in a multicylinder internal combustion engine comprising: means for outputting rotational signals at intervals of a given rotational angle of the engine; means for calculating a rotational speed fluctuation quantity for each cylinder of the engine in each expansion stroke based upon an output signal from the rotational signal outputting means; means for storing therein a reference misfire determination value which is set depending upon an operating condition of said engine; means for storing therein a misfire determination value correction coefficient which is set depending upon the dispersion of the combustion conditions among the cylinders when the combustion in said engine is normal; means for setting a misfire determination value for each cylinder from the values stored in said reference misfire determination value storing means and the values stored in said misfire determination value correction coefficient storing means; and means for determining occurrence of misfire in said engine by comparing a result of calculation of said rotational speed fluctuation quantity calculating means with the misfire determination value for each cylinder.

In accordance with the apparatus of the first aspect of the present invention, the misfire determination value for each cylinder is determined from a reference misfire determination value stored in the reference misfire determination value storing means and the misfire determination value correction coefficient for each cylinder stored in the misfire determination value correction coefficient storing means. Accordingly, the quantity of data necessary for setting the misfire determination values for respective cylinders can be reduced and the storage capacity of the storing means for storing the misfire determination values and the misfire determination correction coefficients can be reduced.

In a second aspect of the present invention, there is provided an apparatus for detecting misfire occurring in a multicylinder internal combustion engine comprising: means for outputting rotational signals at intervals of a given rotational angle of the engine; means for calculating a rotational speed fluctuation quantity in each expansion stroke of each cylinder of the engine based upon an output signal from the rotational signal outputting means; means for storing therein a reference misfire determination value in accordance with an average rotational speed fluctuation quantity for all cylinders in a normal operating condition of said engine; misfire determination value setting means, which reads the reference misfire determination value from said reference misfire determination value storing means, and which corrects the read-out reference misfire determination value based upon a difference between an average rotational speed fluctuation quantity corresponding to the read-out reference misfire determination value and an actual rotational speed fluctuation quantity for each cylinder which is calculated by said rotational speed fluctuation quantity calculating means, for setting the corrected reference misfire determination value as a misfire determination value for each cylinder; and means for determining occurrence of misfire in said engine by comparing a result of calculation of said rotational speed fluctuation quantity calculating means with the misfire determination value for each cylinder.

In accordance with the apparatus of the second aspect of the present invention, it is not required to obtain and store even adaptive conditions for the cylinders as compared with the case in which correction coefficients for adaptation to the dispersion of the cylinders are preliminarily provided. Thus, this apparatus is more simple and convenient. Besides, it is capable of automatically coping with structural differences in engine bodies and a change with time of the engine, so that accurate misfire detection can always be made.

In a third aspect of the present invention, there is provided an apparatus for detecting misfire in a multicylinder internal combustion engine comprising: means for outputting rotational signals at intervals of a given rotational angle of the engine in response to the rotation of the engine; means for calculating a rotational speed fluctuation quantity in each expansion stroke of each cylinder of the engine based upon an output signal from the rotational signal outputting means; means for storing therein a reference misfire determination value which is uniformly set for all cylinders depending upon an operating condition of said engine; means for storing therein a misfire determination value correction value for each cylinder which is set for each cylinder depending upon the dispersion of the combustion conditions among the cylinders when the combustion in said engine is normal; and means for determining occurrence of misfire in said engine based on the rotational speed fluctuation quantity in each expansion stroke of each cylinder, the correction coefficient for each cylinder, and the reference misfire determination value which is set uniformly for all cylinders.

As modifications of the apparatus of the third aspect of the present invention, apparatuses for detecting misfire in a multicylinder internal combustion engine having various structural features are provided.

These and other advantages, features and objects of the present invention will be clarified from the following description of the embodiments of the present invention with reference to the accompanying drawings.

BRIEF DESCRIPTION OF THE DRAWINGS

FIG. 4 is an explanatory view showing an REF map;

FIG. 5 is an explanatory view showing a $\Delta REFn$ map;

FIG. 9 is an explanatory view showing an OMG map;

FIG. 10 is an explanatory view showing a PLS map; and

DESCRIPTION OF THE PREFERRED EMBODIMENTS

Embodiments of the present invention will be described with reference to the accompanying drawings.

Figure 1:
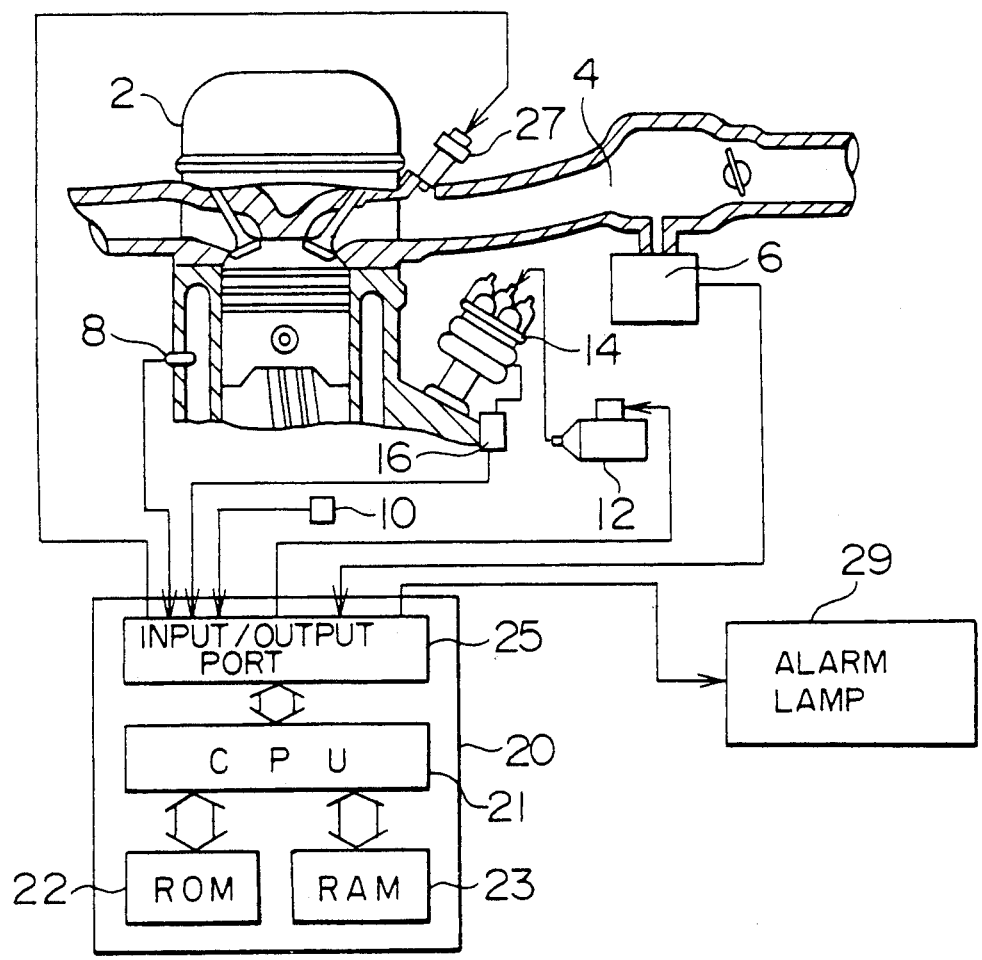
FIG. 1 is a schematic sectional view showing a six-cylinder internal combustion engine and peripheral associated units in an embodiment of the present invention.

FIG. 1 is a schematic structural view showing a 6-cylinder internal combustion engine 2 (hereinafter simply referred to as "internal combustion engine") and peripheral associated units to which the present invention has been applied.

As shown in FIG. 1, the internal combustion engine 2 is provided with sensors for detecting operating conditions of the internal combustion engine. These sensors include an intake air pressure sensor 6 for detecting the pressure in an intake air pipe 4 (intake air pressure), a sensor 8 for detecting the temperature of the coolant, a rotational angle sensor 10 mounted on a crank shaft of the internal combustion engine 2 and generating a pulse signal each time when the crank shaft has rotated by a predetermined angle (30 degrees CA in the present embodiment), and a cylinder identification sensor 16 mounted on a distributor 14, which sequentially distributes a high voltage generated by an igniter 12 to ignition plugs disposed on respective cylinders of the internal combustion engine 2, to generate a pulse signal at every rotation of the distributor 14 (that is, one pulse for two rotations of the crank shaft of the internal combustion engine 2).

Detection signals from these sensors are inputted to an electronic control unit (ECU) 20. The ECU 20 is mainly composed of CPU 21 (which is a well-known microprocessor), ROM 22 and RAM 23. The detection signals from the sensors are inputted to the ECU 20 through an input/output port 25. The ROM 22 corresponds to the above-mentioned reference misfire determination value storing means and misfire determination value correction coefficient storing means.

The CPU 21 executes an engine control processing to control an amount of fuel injected from an fuel injection valve 27, which is disposed on each cylinder of the internal combustion engine 2, and the high voltage generation timing of the igniter 12 (i.e. ignition timing), in accordance with a control program which is preliminarily stored in the ROM 22, and, at the same time, executes a misfire detection processing to detect misfire occurring in the internal combustion engine 2 based on the detected value of the rotational speed in each expansion stroke of each cylinder of the internal combustion engine and to light an alarm lamp 29.

Now, the misfire detection processing, which is a main processing of the present invention and is executed by the ECU 20 having the above-mentioned structure, and a failure diagnosis processing, which makes the alarm lamp 29 lighted in response to a misfire detection result of the misfire detection processing, will be described with reference to flow charts shown in FIGS. 2 and 3.

Figure 2:
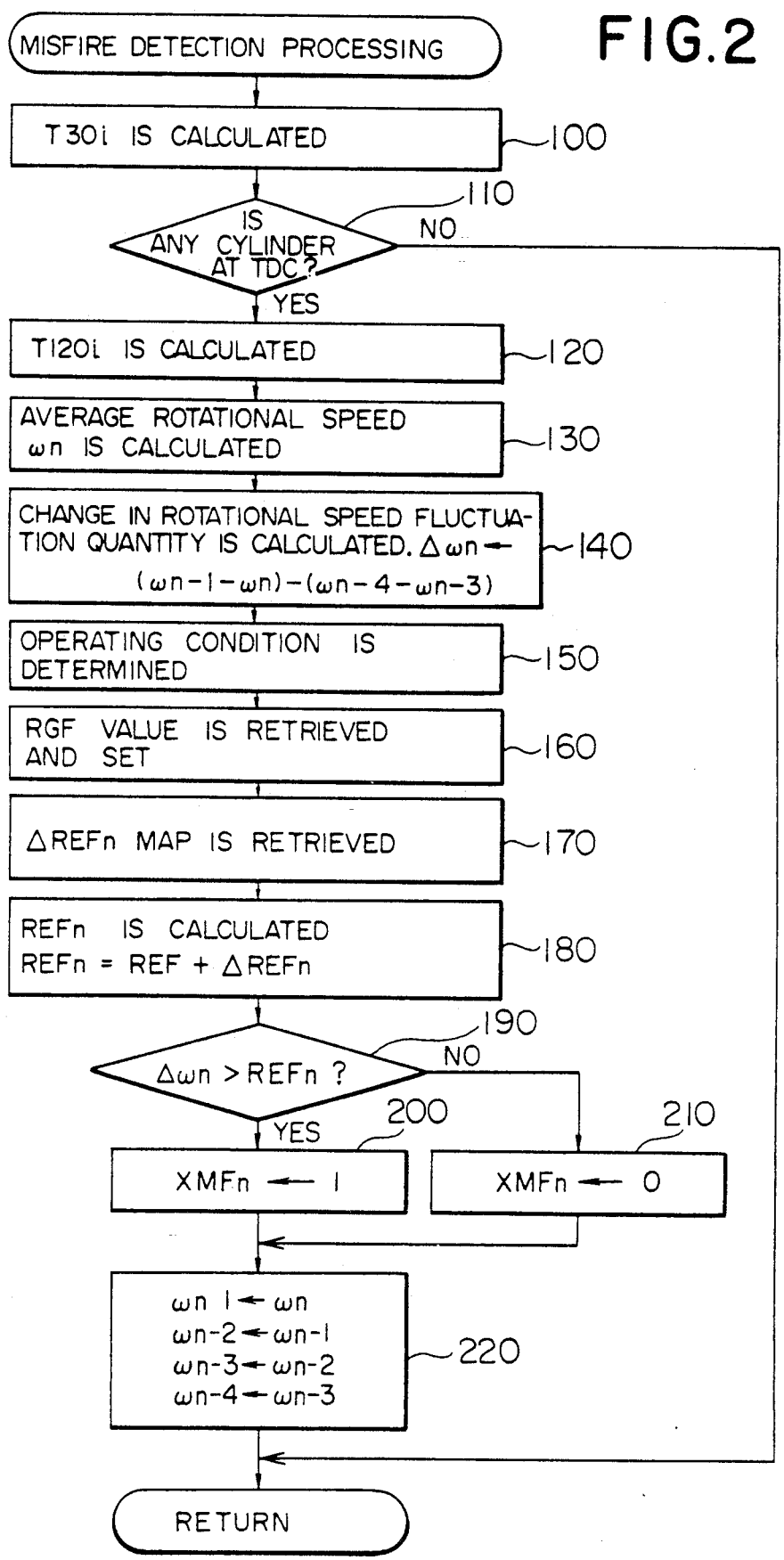
FIG. 2 is a flow chart showing a misfire detection processing executed by an ECU.

The misfire detection processing shown in FIG. 2 is an interrupt processing executed by the CPU 21 at intervals of a predetermined crank angle (30 degrees CA in the present embodiment) of the internal combustion engine 2 in response to an output signal from the rotational angle sensor 10. When this processing is started, in step 100, a time period T 30i, which is required for the internal combustion engine 2 to rotate through 30 degrees CA, is calculated from a time difference between the current interrupt processing time and the last interrupt processing time. Determination as to whether any one of the cylinders is currently at the top dead center (TDC) or not is made in next step 10. If no cylinder is at TDC, the main routine is terminated. If any one of the cylinders is at TDC, the processing proceeds to step 120. In this case, if any one of the cylinders is at TDC, this cylinder is designated by n and the following processing is executed. The cylinder identification number n is set as n=1 when the reference cylinder #1 is determined to be at TDC in response to a pulse signal inputted from the cylinder discrimination sensor 16 in a cylinder discrimination processing routine. Thereafter, the cylinders are discriminated successively and the cylinder identification number is changed at every four pulse input from the rotational angle sensor 10 (at every TDC) as shown below:

$$n = 5 \rightarrow n = 3 \rightarrow n = 6 \rightarrow n = 2 \rightarrow n = 4$$

In step 120, data of four times in total including the time T 30i taken to rotate through 30 degrees CA, which was calculated in step 100, T 30i−1, T 30i−2 and T 30i−3 which have been calculated in the last, last but one and last-but two execution steps, respectively, are totaled so that the time period T 120i which has been taken for the internal combustion engine 2 to rotate through 120 degrees CA is calculated. In step 130, an average rotational speed $\omega_n$ while the internal combustion engine 2 rotates through 120 degrees CA is calculated by calculating a reciprocal of the calculated time T 120i.

In step 140, the speed variation quantity $\Delta\omega$ of the internal combustion engine 2 is calculated in accordance with the following equation using respective average rotational speeds $\omega_n$, $\omega_{n-1}$, $\omega_{n-3}$ and $\omega_{n-4}$ which have been obtained by the current, last, last but two and last but three calculations performed in step 130, respectively.

$$\Delta\omega_n = (\omega_{n-1} - \omega_n) - (\omega_{n-4} - \omega_{n-3}) \quad (1)$$

In the above equation (1), $(\omega_{n-1} - \omega_n)$ and $(\omega_{n-4} - \omega_{n-3})$ represent respective rotational speed fluctuation quantities among the cylinders in which expansion strokes occur successively. $(\omega_{n-1} - \omega_n)$ represents a latest value, and $(\omega_{n-4} - \omega_{n-3})$ represents a value which has been obtained 360 degrees CA before.

The processing of the above-mentioned steps 100 to 140 correspond to the above-mentioned rotational speed fluctuation quantity calculating means. That is, in the present embodiment, the internal combustion engine 2 is a six-cylinder internal combustion engine, and therefore the time period when one cylinder is in its expansion stroke corresponds to the time period of 120 degrees CA before TDC for a cylinder which will be in its expansion stroke next time. A rotational speed in the expansion stroke of each cylinder is obtained by calculating an average rotational speed $\omega_n$ at every 120 degrees CA of the engine 2 in steps 100 to 130. A newest rotational speed fluctuation quantity is obtained from the present rotational speed and the last rotational speed in step 140. A rotational speed variation quantity $\Delta\omega_n$ of the engine 2 to be used for the misfire determination is calculated from a newest rotational speed fluctuation quantity and a rotational speed fluctuation quantity which is obtained 360 degrees CA before. Although a newest rotational speed fluctuation quantity and a rotational speed fluctuation quantity 360 degrees CA before are simultaneously obtained by the use of the above equation (1) in the present embodiment, if a newest rotational speed fluctuation quantity is stored in the RAM 23, a rotational variation quantity $\Delta\omega_n$ can be obtained by reading a rotational speed fluctuation quantity 360 degrees CA before from the RAM 23, without calculating a rotational speed fluctuation quantity 360 degrees CA before.

In next step 150, the current operating condition such as the rotational speed NE and intake pipe pressure PM is determined, and the processing proceeds to step 160. In step 160, a reference misfire determination value REF, which is uniform for all cylinders, is set by retrieving a two-dimensional map (REF map), shown in FIG. 4, containing the rotational speed NE and the intake pipe pressure PM, which are preliminarily stored in the ROM 22, as parameters, in accordance with the engine operating condition (the rotational speed NE and the intake pipe pressure PM) which have been determined in step 150.

In next step 170, a correction value $\Delta REFn$ for each cylinder, which is a misfire determination value correction coefficient for correcting for each cylinder the uniform determination value REF for all cylinders, is set by retrieving a two dimensional map ($\Delta REFn$ map), shown in FIG. 5, containing the rotational speed NE and the cylinder identification number, which are preliminarily stored in the ROM 22, as parameters, on the basis of the rotational speed NE which has been determined in step 150, the current rotational speed $\omega_n$ and the cylinder number with respect to which the speed variation quantity $\Delta\omega_n$ has been calculated.

In following step 180, a determination value REF(=REF+$\Delta REFn$) for the cylinder, the speed variation quantity $\Delta\omega$ of which has been determined in step 140 this time, is determined from the uniform determination value REF for all cylinders and the correction value $\Delta REFn$ for each cylinder which has been set in steps 160 and 170, respectively. In following step 190, misfire determination is made by comparing the determination value REFn for each cylinder with the speed variation quantity $\Delta\omega_n$ which has been obtained in step 140.

In other words, determination that misfire has occurred is made, if the speed variation quantity $\Delta\omega_n$ is larger than the determination value REFn for each cylinder, and then the processing proceeds to step 200. Determination that no misfire has occurred is made, if the speed variation quantity $\Delta\omega_n$ is not larger than the determination value REFn for each cylinder, and then the processing proceeds to step 210.

In step 200, a misfire detection flag XMFn representing that misfire has occurred in the associated cylinder is set, and then the processing proceeds to next step 220. While, in step 210, the misfire detection flag XMFn is reset, and the processing proceeds to next step 220.

In step 220, in order to be prepared for the next processing, the newest average rotational speed $\omega_n$, which has been obtained in step 130, is changed to the last average rotational speed $\omega_{n-1}$, the last average rotational speed $\omega_{n-1}$ to the last but one average rotational speed $\omega_{n-2}$, the last but one average rotational speed $\omega_{n-2}$ to the last but two rotational average speed $\omega_{n-3}$, and the last but two average rotational speed $\omega_{n-3}$ to the last but three average rotational speed $\omega_{n-4}$, and the thus changed average rotational speeds are stored in the RAM 22, and then the processing returns to the main routine.

The foregoing operations in steps 150 to 180 correspond to the above-mentioned misfire determination value setting means. In the present invention, the determination value REFn for each cylinder is calculated from the determination value REF, which is uniform for all cylinders, and the correction value $\Delta$REF for each cylinder, in accordance with the operating conditions of the internal combustion engine 2. This is due to the fact that it is necessary to provide the REF map shown in FIG. 4 for each cylinder in order to directly set the determination value REFn for each cylinder in accordance with the operating conditions of the internal combustion engine 2. By virtue of the calculation of the determination value REFn for each cylinder as mentioned above, it is made possible to reduce the number of maps which should be stored in the ROM 22 and thereby decrease the required storage capacity of the ROM 22.

Figure 11:
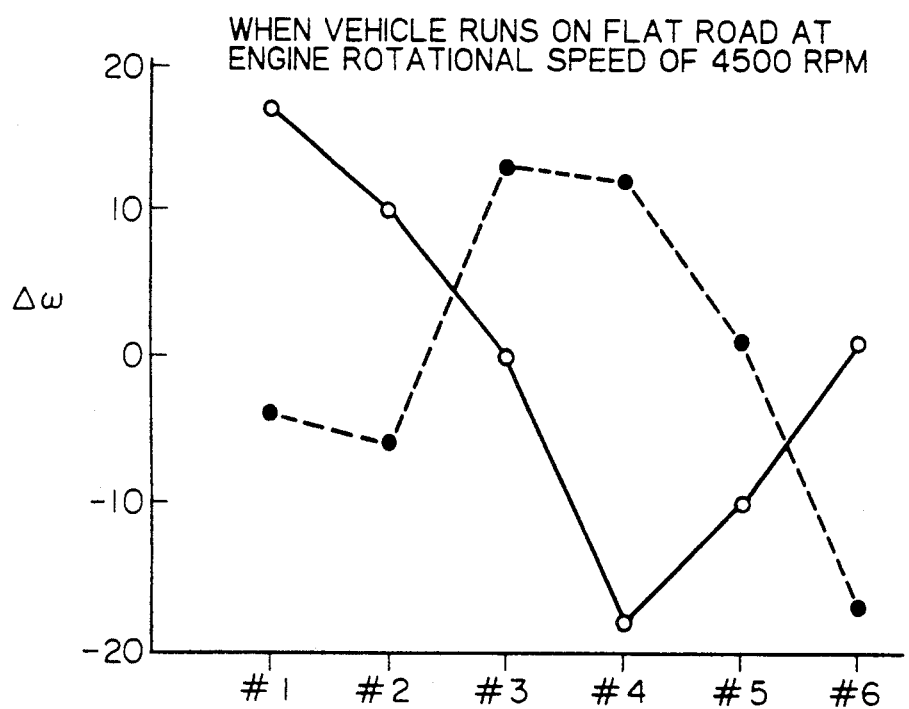
FIG. 11 is a graph showing the change $\Delta \omega$ of the rotational speed fluctuation quantities for respective cylinders when a six-cylinder internal combustion engine is operated at a high rotational speed.

The two-dimensional maps shown in FIGS. 4 and 5 (REF map and $\Delta$REFn map) stored in the ROM 22 are set as follows:

An REF is set between the value of $\Delta\omega$ when misfire occurs and the value of $\Delta\omega$ in a normal operation state, on the basis of the value of $\Delta\omega$ for a particular reference cylinder (for example, the fourth cylinder #4 shown in FIG. 11) and taking into consideration the dispersion and the like appearing among respective engines. This setting is made for each engine operating condition, whereby it is possible to set an REF map, as shown in FIG. 4, for calculating a determination value REF which is uniform for all cylinders.

Then, a correction value $\Delta$REFn for each cylinder is set by using the value of $\Delta\omega$ for a particular cylinder (#4) in a normal operation as a reference value. In this case, it is desirable that the correction value $\Delta$REFn be adjusted as to each value of the rotational speeds NE of the engine 2 corresponding to the REF map. However, the adjustment may be more rough than as to each value of the rotational speeds NE in the REF map so as to reduce the storage capacity of the ROM 22. Further, it is not necessary to use the intake pipe pressure PM indicative of a load on the engine 2 as a parameter. A condition at a high load where the dispersion of the value of $\Delta\omega$ in a normal operation is not large, may be optionally set. Thus, the values of $\Delta$REFn are determined as to respective rotational speeds NE and respective cylinders of the engine 2, by using the following equation (2), to thereby set the $\Delta$REF map.

$$\Delta REFn = \Delta\omega_4 - \Delta\omega_4 \tag{2}$$

wherein $\Delta\omega_n$ denotes the value of $\Delta\omega$ of the cylinder #n in a normal operation, $\Delta\omega_4$ denotes the value of $\Delta\omega$ of a particular cylinder (#4 cylinder) in a normal operation, which is taken as a reference cylinder, and the value of $\Delta$REFn of the particular reference cylinder (#4 cylinder) is 0.

Figure 3:
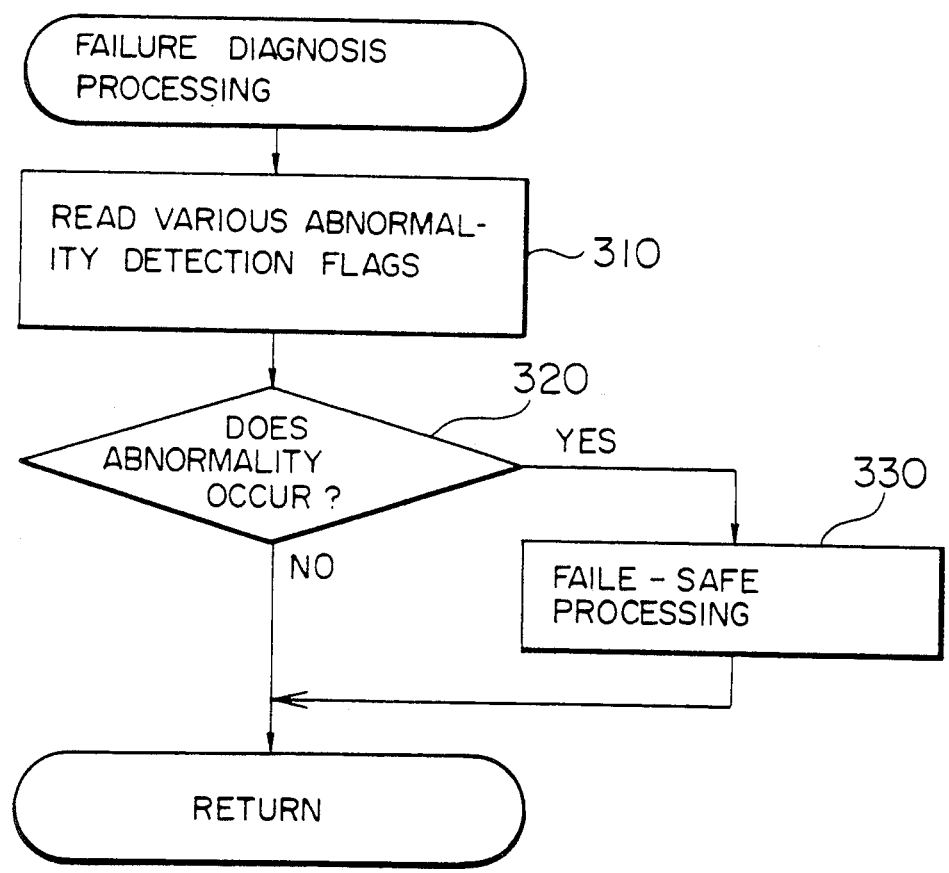
FIG. 3 is a flow chart showing a failure diagnosis processing executed by the ECU.

A failure diagnosis processing shown in FIG. 3 is an interrupt processing executed at intervals of a predetermined period of time in CPU 21. In step 310, various abnormality detection flags, such as an abnormality detection flag for storing information from various sensors so as to detect whether an actuator is normally operating, for example, a misfire detection flag XMFn, which is set when occurrence of misfire is determined in the above-mentioned misfire detection processing, and the like detection flag are read.

In next step 320, the state of setting or resetting of various abnormality detection flags which have been read in step 310 is determined. For example, if the misfire detection flag XMF has been set, the processing proceeds to step 330. While, if it has been reset, the processing returns to the main routine.

In step 330, well known fail-safe operations resulting from the abnormality detection are performed, which include: interruption of fuel supply to an engine cylinder, in which occurrence of misfire has been detected, in order to protect a catalyst or to prevent an HC concentration in an exhaust gas from being increased; and lighting of the alarm lamp 29 which informs a driver, etc. of the occurrence of misfire.

As explained above, in the present embodiment, a misfire determination value is set for each cylinder to determine occurrence of misfire in the engine 2. Accordingly, the misfire determination can be made accurately, even when the engine 2 is operating at a high speed and the speed variation quantity $\Delta\omega_n$ differs with each cylinder. Further in the present embodiment, the determination value REFn for each cylinder is not directly set in accordance with an operating condition of the engine 2, but it is determined from the determination value REF, which is uniform for all cylinders, and the correction value $\Delta$REFn for each cylinder. Therefore, the number of maps necessary for setting the determination value REFn for each cylinder can be reduced, and the storage capacity of ROM 22 necessary for storing the maps can be reduced accordingly.

Figure 6:
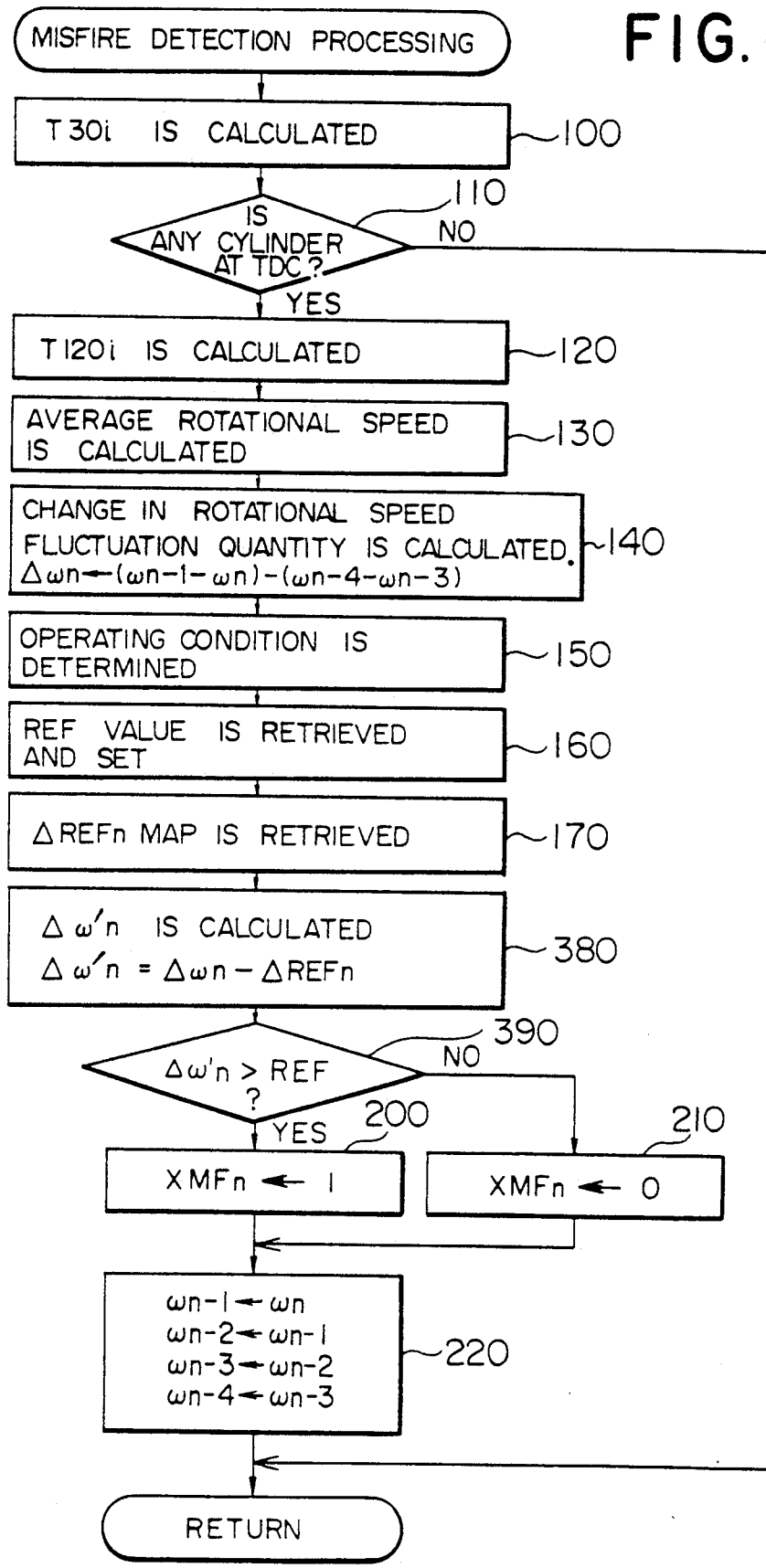
FIG. 6 is a flow chart showing another misfire detection processing.

In the above embodiment, the determination value $\Delta$REFn for each cylinder is determined by correcting the determination value REF, which is uniform for all cylinders, by using the correction value $\Delta$REFn for each cylinder. The processings in steps 180 and 190 shown in FIG. 2 may be replaced by the processings in steps 380 and 390 shown in FIG. 6. In the latter processings, in step 380, the speed variation quantity $\Delta\omega$, which has been obtained in step 140, is corrected by using the correction value $\Delta$REFn for each cylinder in accordance with the following equation (3) to obtain the correction value $\Delta\omega'_n$. In step 390, this correction value $\Delta\omega'_n$ is compared with the determination value REF, which is uniform for all cylinders, to thereby make misfire determination.

$$\Delta\omega'_n = \Delta\omega_n - \Delta REFn \qquad (3)$$

Although, in the foregoing embodiment, the detection of misfire occurring in a six-cylinder internal combustion engine has been described, the present invention is also applicable to any other multicylinder internal combustion engine, such as a three-cylinder engine, four-cylinder engine, etc.

Figure 7:
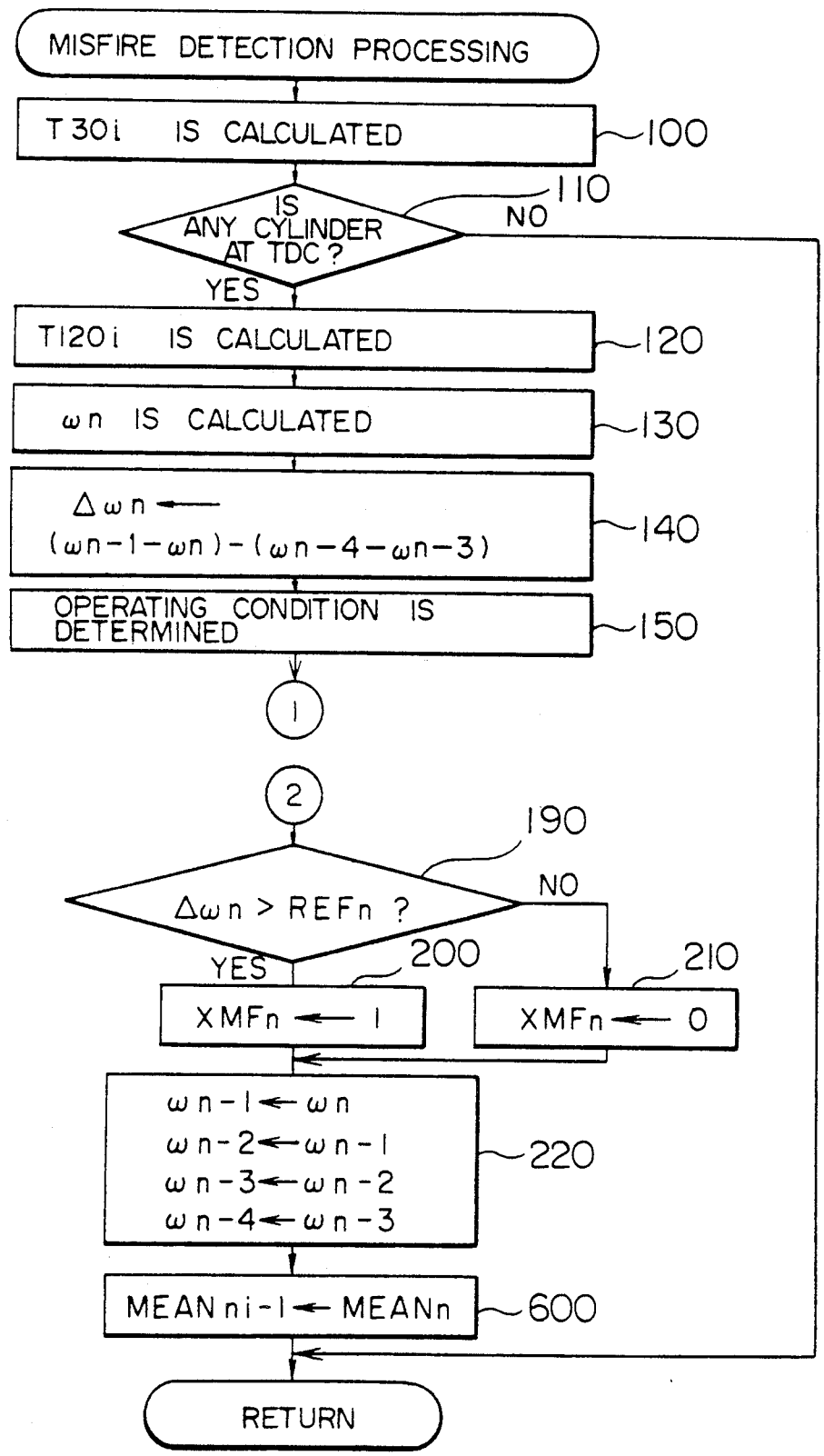
FIG. 7 is a flow chart showing a misfire detection processing executed by the ECU in another embodiment of the present invention.

Another embodiment will be described hereunder. The misfire detecting apparatus of this embodiment is substantially identical with the foregoing embodiment shown in FIG. 1. Only, the misfire detection processings shown in FIG. 2 are modified to the misfire detection processings shown in FIGS. 7 and 8. Since the steps 100 to 150 and the steps 190 to 220 in FIG. 7 are substantially identical with those of the foregoing embodiment, a repeated description thereof is omitted. The processings in step 410 and subsequent steps in FIG. 8 will be described.

Figure 8:
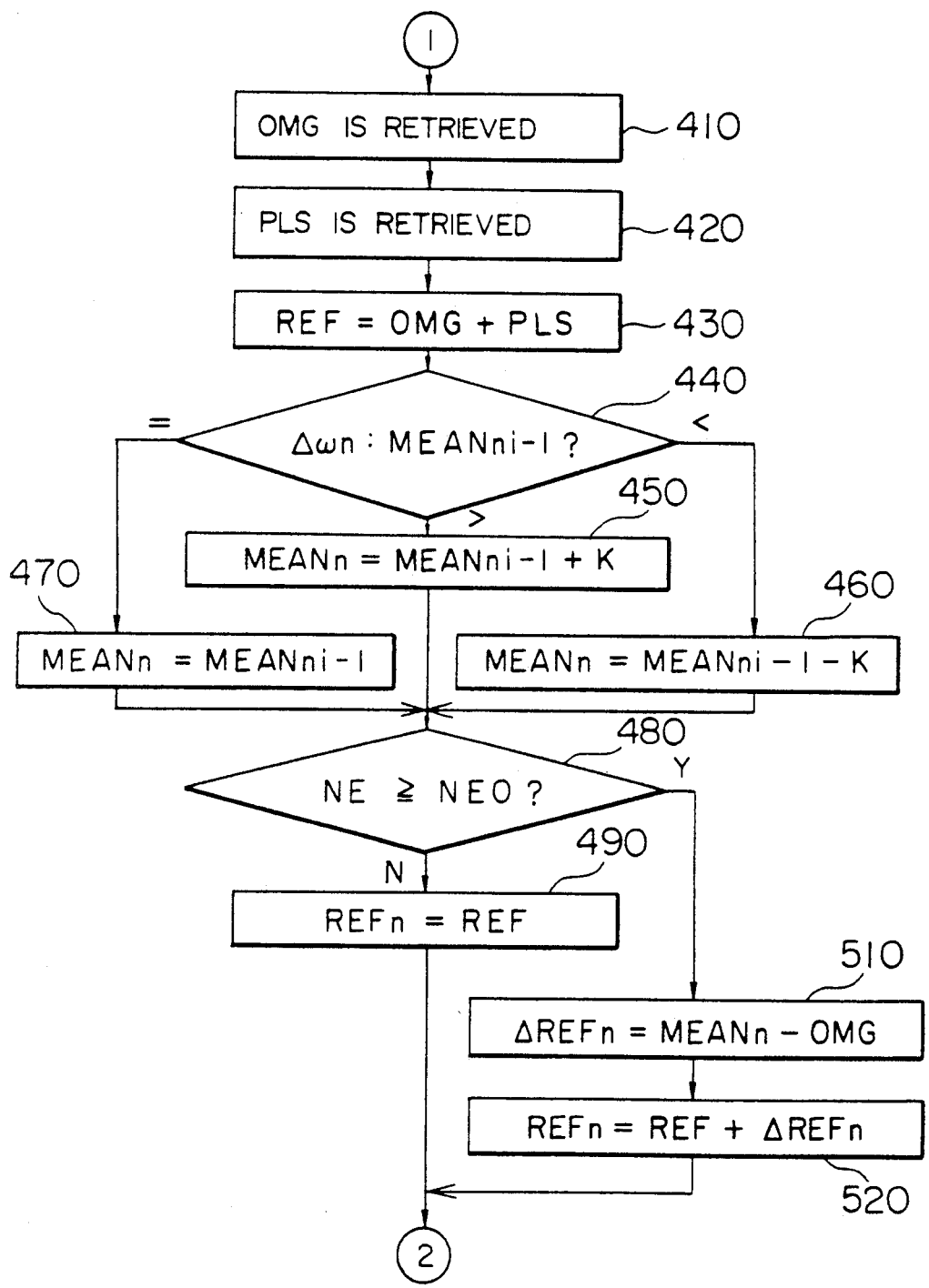
FIG. 8 is a flow chart showing a misfire detection processing executed by the ECU in a further embodiment of the present invention.

The speed variation quantity $\Delta\omega_n$ in the expansion stroke of the n-th cylinder is calculated by the processings in steps 100 to 150 to determine the current operating conditions such as the rotational speed NE and the intake pipe pressure PM, and then the processing proceeds to step 410 in FIG. 8. In step 410, a reference rotational speed fluctuation quantity OMG in the current operating condition is obtained by retrieving a two-dimensional map (OMG map), shown in FIG. 9, containing the rotational speed NE and the intake pipe pressure PM, which are preliminarily stored in ROM 22, as parameters, in accordance with the current operating condition. The reference rotational speed fluctuation quantity OMG represents an average reference rotational speed fluctuation quantity for all cylinders in a normal operating state with no occurrence of misfire. The OMG map is set in accordance with each engine model at the time of shipment thereof.

The processing then proceeds to step 420. In step 420, a reference additional quantity PLS in the current operating condition is obtained by retrieving a two dimensional map shown in FIG. 10 (PLS map) containing the rotational speeds NE and the intake pipe pressure PM, which are preliminarily stored in ROM 22, as parameters, on the basis of the current operating condition. This reference additional quantity PLS provides a reference misfire determination value when combined with the reference rotational speed fluctuation quantity OMG, and it is also set in accordance with each engine model at the time of shipment thereof. If the reference additional quantity PLS is too small, the misfire determination becomes oversensitive. While, if it is too large, the misfire detection becomes insensitive. Accordingly, the PLS is determined to have a value such that the misfire detection would not become too sensitive nor too insensitive. For example, the PLS may be determined by making reference to a standard deviation obtained when the reference rotational speed fluctuation quantity OMG has been determined experimentally.

After the reference rotational speed fluctuation quantity OMG and the reference additional quantity PLS have been determined as described above, the processing proceeds to step 430, in which the operation of the following equation (4) is executed, and thus the addition of both OMG and PLS is made to provide the reference misfire determination value REF. At this time, the reference misfire determination value REF is determined uniformly for all cylinders only in accordance with the operating condition of the engine 2.

$$REF = OMG + PLS \qquad (4)$$

Next, the processing proceeds to step 440. In step 440, a current rotational speed variation quantity $\Delta\omega_n$ for a cylinder in its expansion stroke, which has been determined in step 140, is compared with the last calculated value MEANni−1 corresponding to the average engine speed fluctuation quantity for the same cylinder.

If the result of comparison shows that $\Delta\omega_n >$ MEANni−1, the processing proceeds to step 450. In step 450, a predetermined value k is added to the last obtained value MEANn−1 of the average engine speed fluctuation quantity for each cylinder to thereby provide the current value MEANn, as shown by the following equation (5).

$$MEANn = MEANni-1+k \qquad (5)$$

While, if the result of comparison in step 440 shows that $\Delta\omega_n <$ MEANni−1, the processing proceeds to step 460. In step 460, a predetermined quantity k is substracted from the last obtained value MEANni−1 of the average engine speed fluctuation quantity for each cylinder to provide the current value MEANn, as shown by the following equation (6).

$$MEANn = MEANni-1-k \qquad (6)$$

If the result of comparison in step 440 shows that $\Delta\omega_n =$ MEANni−1, the processing proceeds to step 470. In step 470, the last obtained value MEANni−1 of the average engine speed fluctuation quantity for each cylinder, per se, is taken as the current value MEANn.

Further, an equal predetermined quantity k is used in the operations of addition and subtraction in steps 450 and 460, respectively. This predetermined quantity k is a constant which should be suitably selected based on the transient follow-up property and the steady operation state stability of the average engine speed fluctuation quantity for each cylinder MEANn. This predetermined quantity k is not necessarily selected to be equal in both addition and subtraction.

If the value MEANn is calculated as the current engine speed fluctuation quantity for a cylinder, which is currently in its expansion stroke, considering the past behavior of the same cylinder, the processing proceeds to step 480. In step 480, determination is made as to whether the rotational speed NE of the engine 2 is equal to or higher than a predetermined rotational speed NEO. If step 480 decides that the current rotational speed NE is lower than a predetermined rotational speed NEO, the processing proceeds to step 490. In step 490, the reference misfire determination value REF per se, which has been obtained in step 430 and which is applied uniformly to all cylinders, is set as the reference misfire determination value REFn for each cylinder.

On the other hand, if step 480 decides that the current rotational speed NE is equal to or higher than the predetermined rotational speed NEO, the processing proceeds to step 510. In step 510, the reference rotational speed fluctuation quantity OMG obtained in step 410 is subtracted from the current value MEANn of the average engine speed fluctuation quantity for each cylinder as shown by the following equation (7). The result of the calculation of the equation (7) provides the misfire determination value correction quantity $\Delta REFn$ for each cylinder.

$$\Delta REFn = MEANn - OMG \quad (7)$$

Then, the processing proceeds to step 520. In step 520, the misfire determination value correction quantity $\Delta REFn$ for each cylinder is added to the reference misfire determination value REF, which has been obtained in step 430 and which is applied uniformly to all cylinders, as shown by the following equation (8). The result of the calculation of the equation (8) is set as the misfire determination value REFn for each cylinder.

$$REFn = REF + \Delta REFn \quad (8)$$

Thus, if the misfire determination value REFn for each cylinder is obtained in step 490 or 520 and it is stored in a given storage area of the RAM 23, misfire determination is made by the processings performed in step 190 and subsequent steps. Finally, the average engine speed fluctuation quantity MEANn for each cylinder, which has been obtained this time in step 600, replaces the last value of MEANn of the average engine speed fluctuation quantity for each cylinder, and the processing come to an end. Then, the failure diagnosis processing similar to that performed in the foregoing embodiment shown in FIG. 4 is performed.

In accordance with the above-described embodiments, the reference misfire determination value REF per se, which is uniform for all cylinders, is used for the determination of misfire occurring in a low rotational speed range where the dispersion of the rotational speed fluctuation quantities for respective cylinders does not matter so much. However, the reference misfire determination value $REFn = REF + \Delta REFn$, which is determined considering the correction quantity $\Delta REFn$ calculated for each cylinder, is used in a high rotational speed range where the dispersion of the rotational speed fluctuation quantities for respective cylinders poses a problem. Besides, the misfire determination value correction quantity $\Delta REFn$ for each cylinder is calculated each time based on a difference between the average rotational speed fluctuation quantity MEANn for each cylinder and the average reference rotational speed fluctuation quantity OMG which is uniform for all cylinders. Therefore, the apparatus of the present invention functions to make it possible to perform accurate misfire detection regardless of machine variations of respective engines and a change with time. As a result, the present invention disclosed by the embodiments described with reference to FIGS. 7 to 10 has an advantage such that it is unnecessary to preliminarily take into consideration complicated adaptive conditions in addition to the advantages of the embodiments described with reference to FIGS. 1 to 6 and yet it is made possible to perform more accurate misfire detection.

As described in the foregoing, according to the present invention, a misfire determination value is set for each cylinder of an internal combustion engine and the determination of misfire occurring in the internal combustion engine is made based on this misfire determination value. Therefore, it is possible to perform misfire determination for each cylinder accurately, even when the engine rotates at a high speed and so a change in the engine rotational speed fluctuation quantity may differ at every engine cylinder.

We claim:

1. An apparatus for detecting misfire in a multicylinder internal combustion engine comprising:
    means for outputting rotational signals at intervals of a predetermined rotational angle of said engine;
    means for calculating a rotational speed fluctuation quantity in each expansion stroke of each cylinder of said engine based on an output signal from the rotational signal outputting means;
    means for storing therein a reference misfire determination value which is set depending upon an operating condition of said engine;
    means for storing therein a misfire determination value correction coefficient which is set based on the dispersion of the combustion condition among the cylinders when the combustion in said engine is normal;
    means for setting a misfire determination value for each cylinder from the values stored in said reference misfire determination value storing means and the values stored in said misfire determination value correction coefficient storing means; and
    means for determining occurrence of misfire in said engine by comparing a result of calculation of said rotational speed fluctuation quantity calculating means with the misfire determination value for each cylinder.

2. An apparatus according to claim 1, in which said misfire determination value correction coefficient storing means comprises a read-only-memory for storing the misfire determination value correction coefficients arranged in a two-dimensional map with engine rotational speeds and cylinder numbers used as parameters.

3. An apparatus according to claim 1, in which said misfire determination value setting means includes means for setting the misfire determination value for each cylinder by adding together the reference determination value and the misfire determination value correction coefficient for each cylinder.

4. An apparatus according to claim 1, in which said misfire determination value correction coefficient storing means includes means for calculating the misfire determination value correction coefficient for each cylinder based on an actual rotational speed fluctuation quantity for each cylinder.

5. An apparatus for detecting misfire in a multicylinder internal combustion engine comprising:
    means for outputting rotational signals at intervals of a predetermined rotational angle of said engine;
    means for calculating a rotational speed fluctuation quantity in each expansion stroke of each cylinder of said engine based on an output signal from the rotational signal outputting means;
    means for storing therein a reference misfire determination value in accordance with an average rotational speed fluctuation quantity for all cylinders in a normal operating condition of said engine;
    misfire determination value setting means, which reads the reference misfire determination value from said reference misfire determination value storing means, and which corrects the read-out reference misfire determination value based upon a difference between an average rotational speed fluctuation quantity corresponding to the read-out reference misfire determination value and an actual rotational speed fluctuation quantity for each cylinder which is calculated by said rotational speed fluctuation quantity calculating means, for setting the corrected reference misfire determination value as a misfire determination value for each cylinder; and means for determining occurrence of misfire in said engine by comparing a result of calculation of said rotational speed fluctuation quantity calculating means with the misfire determination value for each cylinder.

6. An apparatus according to claim 5, in which said reference misfire determination value storing means includes:

means for preliminarily storing therein a value representative of an average reference rotational speed fluctuation quantity for all cylinders in accordance with the engine operating condition;

means for preliminarily storing a reference additional quantity, which is used to determine a reference misfire determination value in accordance with the reference rotational speed fluctuation quantity, depending upon an engine operating condition; and means for setting the reference misfire determination value from the reference rotational speed fluctuation quantity and the reference additional quantity.

7. An apparatus according to claim 6, further comprising:

means for determining whether or not a rotational speed of said engine is equal to or higher than a predetermined value; and means for setting said reference misfire determination value, which is uniform for all cylinders, as it is, as the misfire determination value for each cylinder, if the engine rotational speed determining means determines that the engine rotational speed is lower than the predetermined value.

8. An apparatus for detecting misfire in a multicylinder internal combustion engine comprising:

means for outputting rotational signals at intervals of a predetermined rotational angle of said engine in response to the rotation of said engine;

means for calculating a rotational speed fluctuation quantity in each expansion stroke of each cylinder of said engine based on an output signal from the rotational signal outputting means;

means for storing therein a reference misfire determination value which is uniformly set for all cylinders based on an operating condition of said engine;

means for storing therein a correction value for each cylinder which is set for each cylinder based on the dispersion of the combustion condition among the cylinders when the combustion in said engine is normal; and means for determining occurrence of misfire in said engine based on the rotational speed fluctuation quantity in each expansion stroke of each cylinder, the correction value for each cylinder, and the reference misfire determination value which is uniform for all cylinders.

9. An apparatus according to claim 8, in which said misfire determination value correction coefficient storing means comprises a read-only-memory for storing the correction values arranged in a two-dimensional map with engine rotational speeds and cylinder numbers used as parameters.

10. An apparatus according to claim 8, in which said misfire determining means includes: means for setting the misfire determination value for each cylinder by adding together the reference determination value, which is uniform for all cylinders, and the correction value for each cylinder; and means for determining occurrence of misfire by making a comparison between the misfire determination value for each cylinder and the rotation speed fluctuation quantity in each expansion stroke of each cylinder of said engine.

11. An apparatus according to claim 10, further comprising:

means for determining whether or not a rotational speed of said engine is equal to or higher than a predetermined value; and means for setting said reference misfire determination value, which is uniform for all cylinders, as it is, as the misfire determination value for each cylinder, if the engine rotational speed determining means determines that ht engine rotational speed is lower than the predetermined value.

12. An apparatus according to claim 8, in which said misfire determination value correction value storing means includes means for calculating the correction coefficient for each cylinder based on an actual rotational speed fluctuation quantity for each cylinder.

13. An apparatus according to claim 12, in which said reference misfire determination value storing means includes:

means for preliminarily storing therein a value representative of an average reference rotational speed fluctuation quantity for all cylinders in accordance with the engine operating condition;

means for preliminarily storing a reference additional quantity, which is used to determine a reference misfire determination value in accordance with the reference rotational speed fluctuation quantity, depending upon an engine operating condition; and means for setting the reference misfire determination value from the reference rotational speed fluctuation quantity and the reference additional quantity.

14. An apparatus for detecting misfire in a multicylinder internal combustion engine comprising:

means for outputting rotational signals at intervals of a predetermined rotational angle of said engine in response to the rotation of said engine;

means for calculating a rotational speed fluctuation quantity in each expansion stroke of each cylinder of said engine based on an output signal from the rotational signal outputting means;

means for storing therein a reference which is uniformly set for all cylinders based on an operating condition of said engine;

means for storing therein a misfire determination value correction value for each cylinder which is set for each cylinder based on the dispersion of the combustion condition among the cylinders when the combustion in said engine is normal;

means for correcting for each cylinder the rotational speed fluctuation quantity in each expansion stroke of each cylinder by using the correction value for each cylinder; and means for determining occurrence of misfire in said engine by making a comparison between a corrected rotational speed fluctuation quantity for each cylinder and the reference misfire determination value which is uniform for all cylinders.

* * * * *